United States Patent [19]

Luthra

[11] 3,978,182

[45] Aug. 31, 1976

[54] METHOD FOR EXTRUDING A POLYSTYRENE FOAM WITH VARIATIONS IN MASS CONCENTRATION ACROSS THE SHEET AND THERMOFORMING THE SHEET

[75] Inventor: Vinod K. Luthra, East Rochester, N.Y.

[73] Assignee: Mobil Oil Corporation, New York, N.Y.

[22] Filed: Feb. 4, 1974

[21] Appl. No.: 439,513

Related U.S. Application Data

[63] Continuation-in-part of Ser. No. 427,974, Dec. 26, 1973, abandoned.

[52] U.S. Cl. ............................. 264/51; 229/2.5 EC; 264/53; 264/177 R; 264/209; 264/210 R; 264/296; 264/321; 264/DIG. 66; 428/159
[51] Int. Cl.² ................. B29C 17/03; B29D 27/00; B29F 3/04
[58] Field of Search ................... 264/51, 53, 54, 48, 264/DIG. 16, 209, DIG. 33, 296, 177 R, 92, 321, DIG. 66; 229/2.5 BC; 428/159

[56] References Cited
UNITED STATES PATENTS

| | | | |
|---|---|---|---|
| 3,137,748 | 6/1964 | Makowski.................... | 264/DIG. 33 |
| 3,190,943 | 6/1965 | Santelli........................ | 264/51 X |
| 3,217,360 | 11/1965 | Mason et al. ................ | 264/DIG. 33 |
| 3,221,371 | 12/1965 | Stevens........................ | 264/DIG. 33 |
| 3,326,443 | 6/1967 | Burkett ........................ | 264/51 UX |
| 3,374,298 | 3/1968 | Studen......................... | 264/51 X |
| 3,410,933 | 11/1968 | Moseley....................... | 264/51 |
| 3,444,283 | 5/1969 | Carlson........................ | 264/53 |
| 3,454,693 | 7/1969 | Crenshaw.................... | 264/177 R X |
| 3,480,999 | 12/1969 | Carlo ........................... | 264/51 UX |
| 3,484,510 | 12/1969 | Corazza....................... | 264/51 |
| 3,534,128 | 10/1970 | Makowski.................... | 264/51 |
| 3,538,201 | 11/1970 | Eberle et al. ................ | 264/51 X |
| 3,764,642 | 10/1973 | Boutillier..................... | 264/54 X |
| 3,789,095 | 1/1974 | Winstead..................... | 264/DIG. 16 |

FOREIGN PATENTS OR APPLICATIONS 2,063,589   6/1971   France................................ 264/48

Primary Examiner—Philip Anderson
Attorney, Agent, or Firm—Charles A. Huggett; James D. Tierney

[57] ABSTRACT

A thermoplastic foamed resin extruding operation is described which uses an inner die lip machined to vary the width of the die annulus or opening so that varying thicknesses or mass concentrations or densities of preselected desired width will be formed in the extruded resin sheet obtained therefrom. The mass concentration variations in the extruded sheet are coordinated with a downstream thermoforming operation involving deep and shallow draw forming or different sheet fabrications such as folding, scoring, cutting, etc.

3 Claims, 8 Drawing Figures

REDISTRIBUTED MASS SHEET

DIE ORIFICE CONFIGURATION

| | Cover | Cavity | Cover | Thickness and Basis Wt.Profile |
|---|---|---|---|---|
| Gauge | 60 | 100 | 60 | (Mils) |
| Basis Wt. | 15 | 21 | 15 | (Grams/100in²) |
| Density Ratio | 1 | 0.8 | 1 | |
| Carton | | | | |
| Standard A | 9 | 11 | 11 | 9 | (Gms) | 20gm Carton |
| Standard B | 10 | 11.8 | 11.8 | 10 | (Gms) | 21.8gm Carton |
| Redistributed Mass Sheet C | 7 | 12 | 12 | 7 | (Gms) | 19 gm Carton |
| Redistributed Mass Sheet D | 7.4 | 12.6 | 12.6 | 7.4 | (Gms) | 20gm Carton |
| Redistributed Mass Sheet E | 8.2 | 13.6 | 13.6 | 8.2 | (Gms) | 21.8gm Carton |

REDISTRIBUTED MASS SHEET

DIE ORIFICE CONFIGURATION

| | Cover | Cavity | | Cover | Thickness and Basis Wt. Profile |
|---|---|---|---|---|---|
| Gauge | 60 | 100 | | 60 | (Mils) |
| Basis Wt. | 15 | 21 | | 15 | (Grams/100in²) |
| Density Ratio | 1 | 0.8 | | 1 | |
| Carton | | | | | |
| Standard A | 9 | 11 | 11 | 9 | (Gms) 20 gm Carton |
| Standard B | 10 | 11.8 | 11.8 | 10 | (Gms) 21.8 gm Carton |
| Redistributed Mass Sheet C | 7 | 12 | 12 | 7 | (Gms) 19 gm Carton |
| Redistributed Mass Sheet D | 7.4 | 12.6 | 12.6 | 7.4 | (Gms) 20 gm Carton |
| Redistributed Mass Sheet E | 8.2 | 13.6 | 13.6 | 8.2 | (Gms) 21.8 gm Carton |

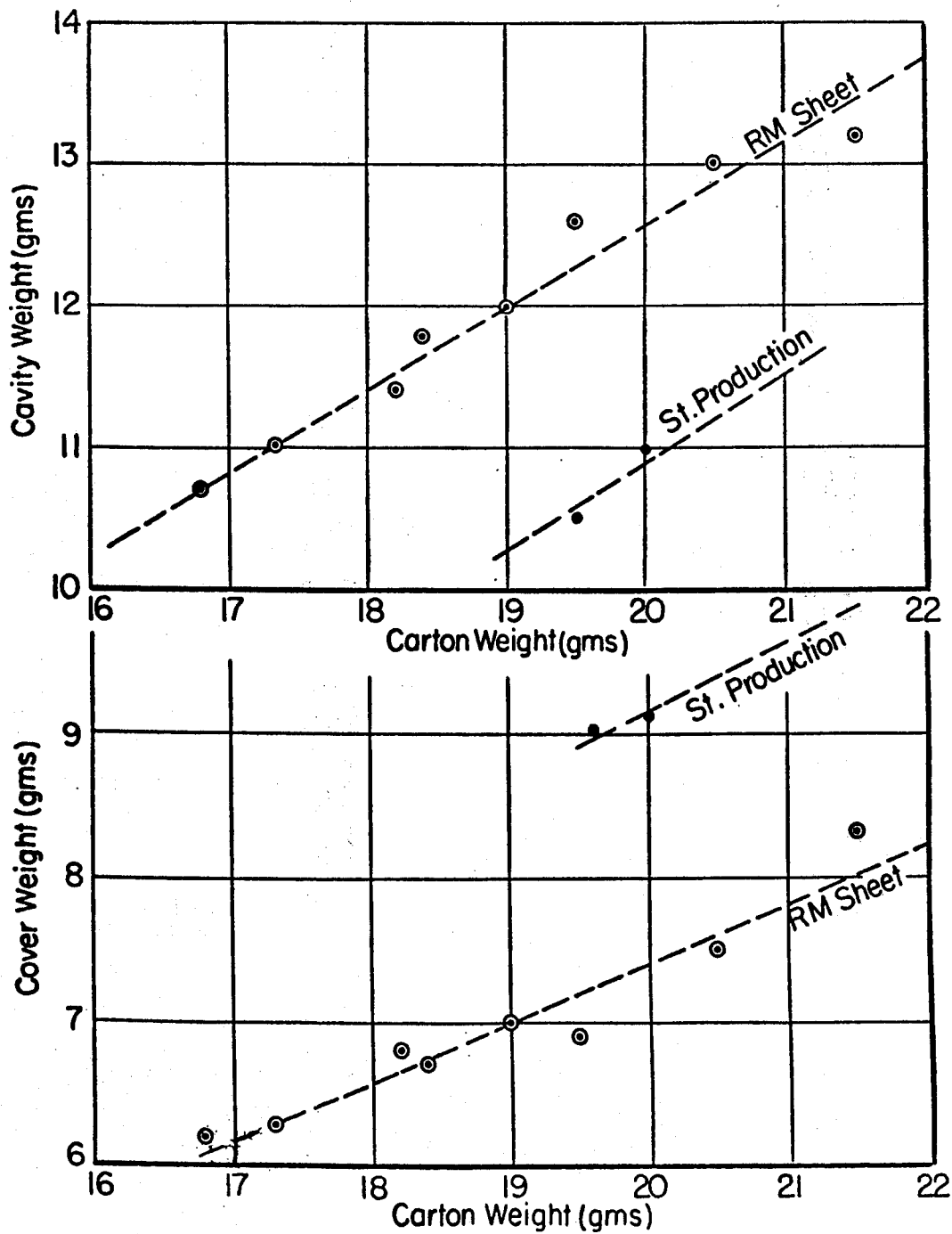
FIGURE II

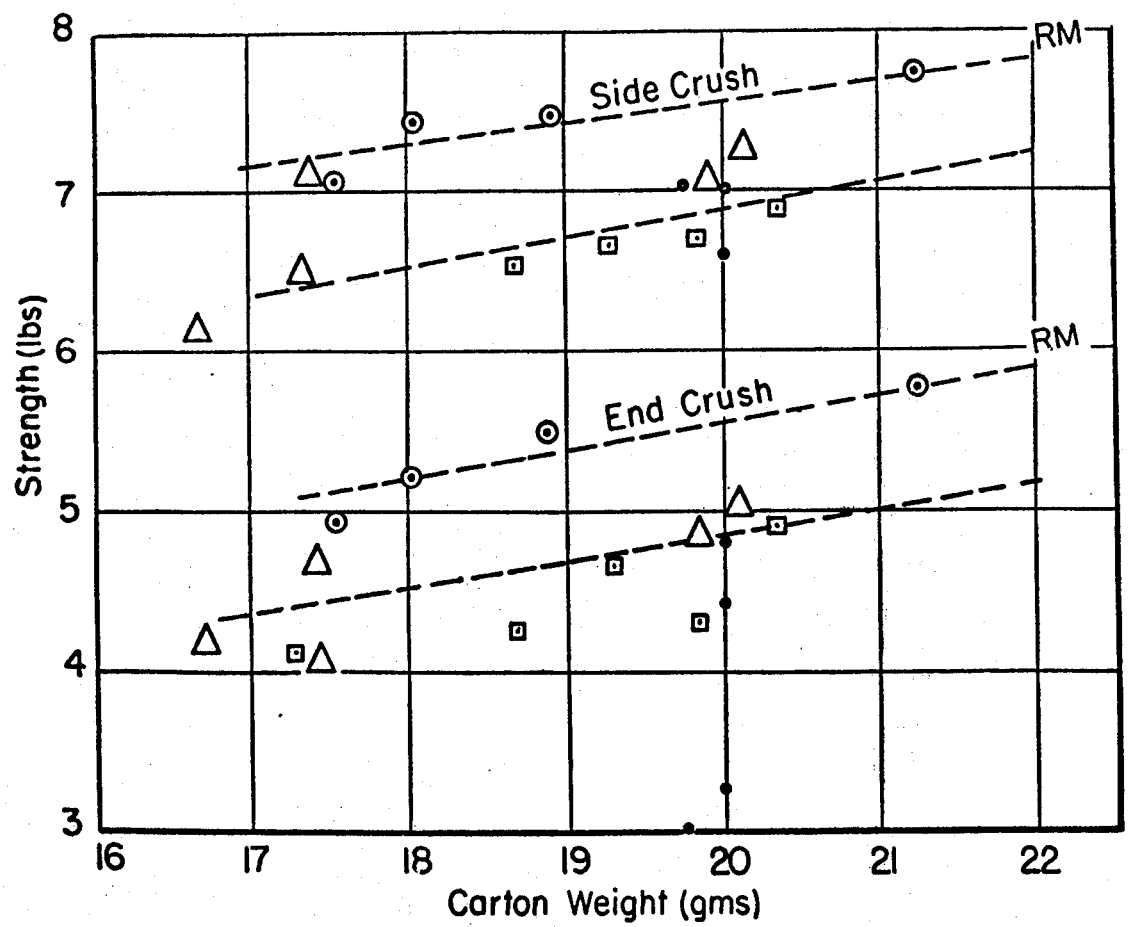

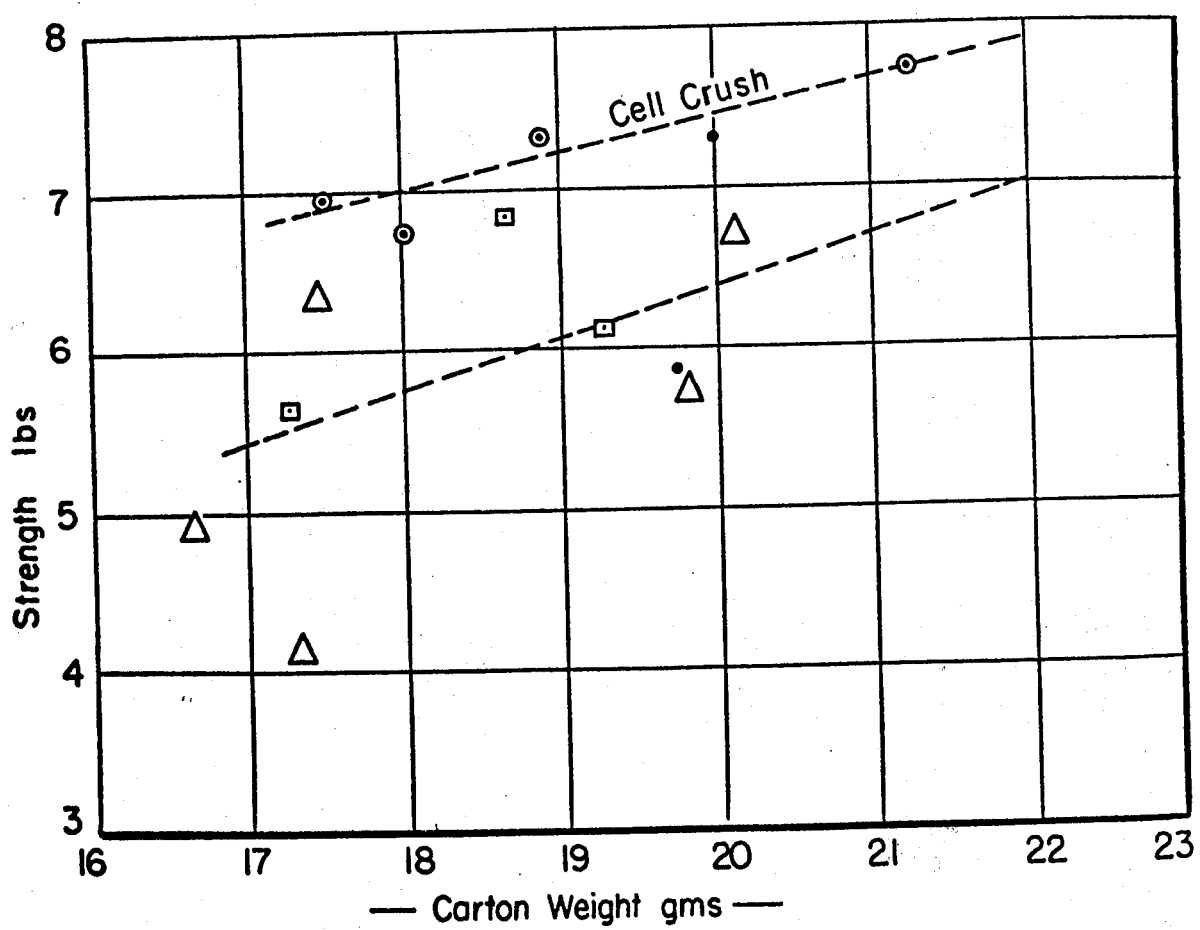

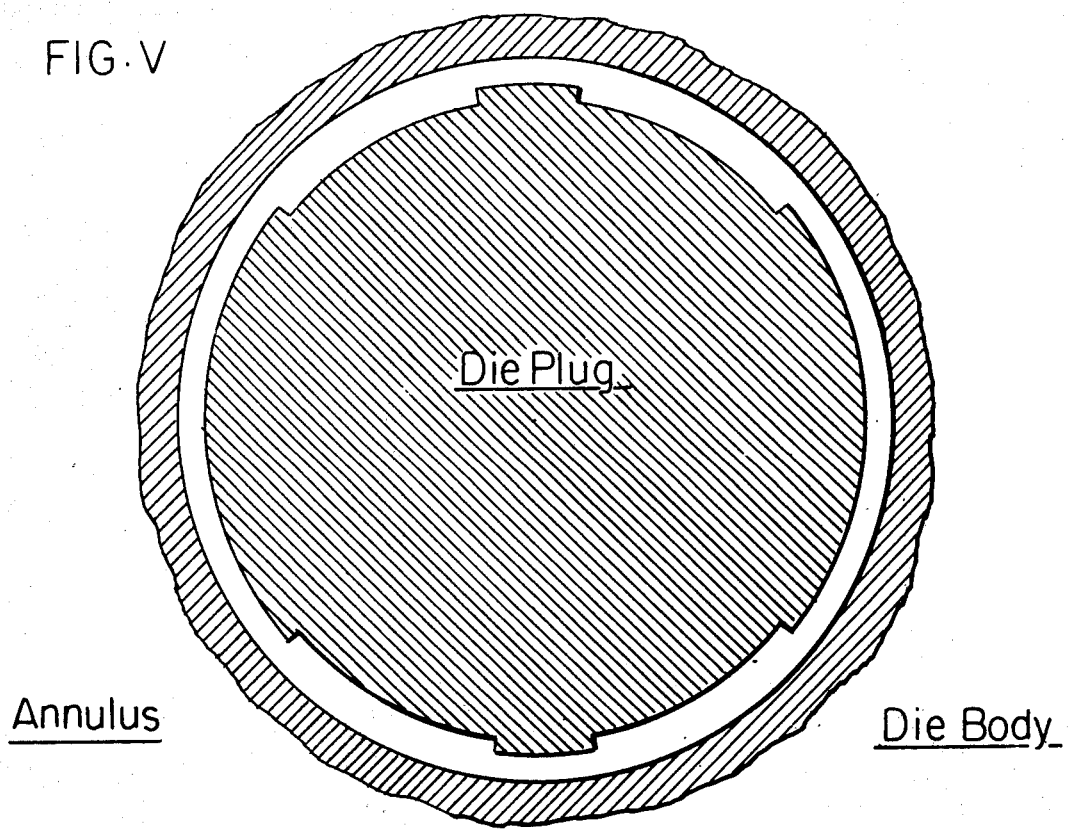
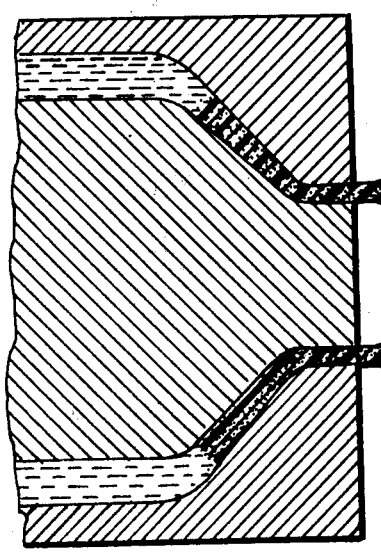

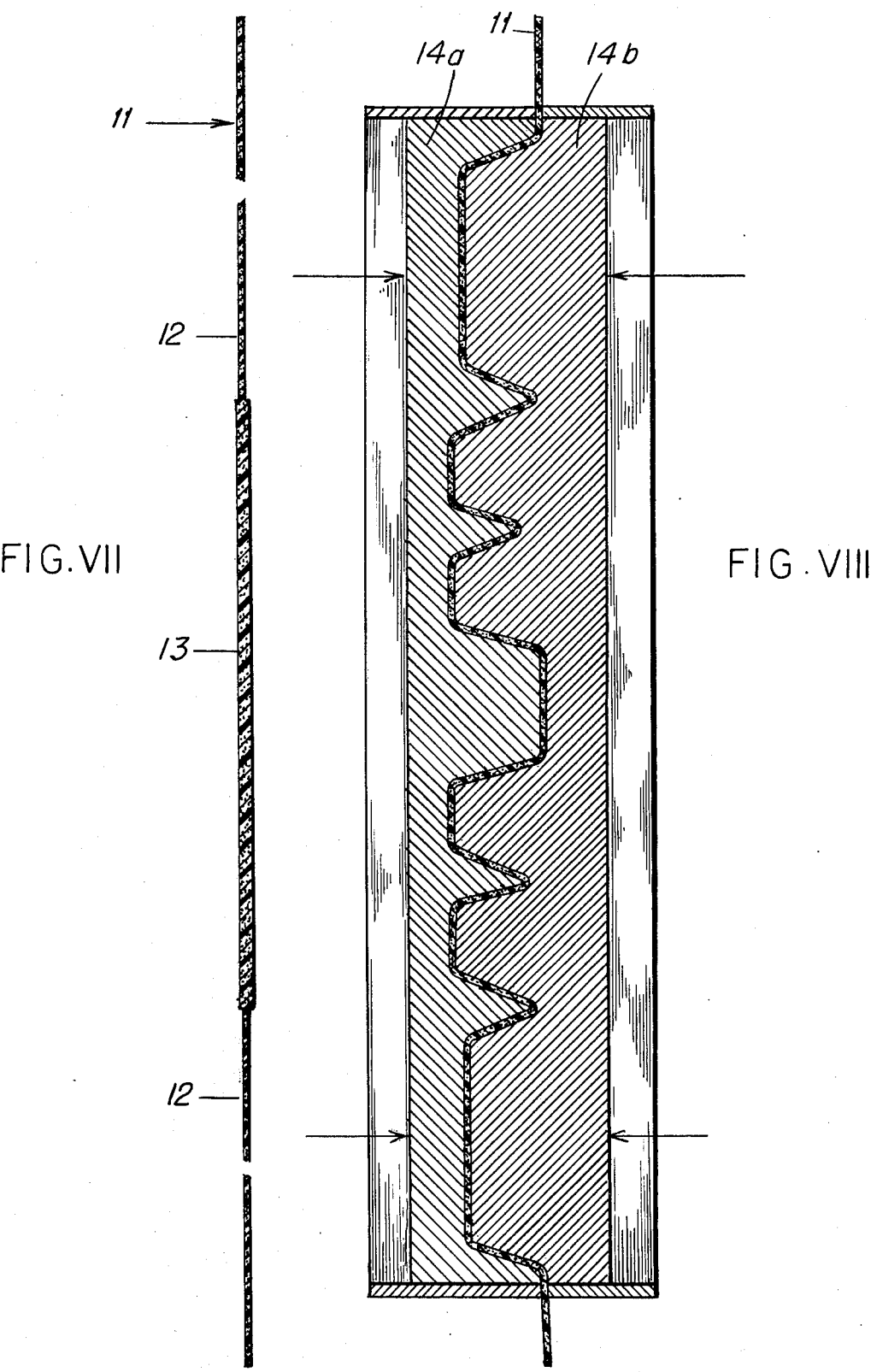
FIG. VII      FIG. VIII

METHOD FOR EXTRUDING A POLYSTYRENE FOAM WITH VARIATIONS IN MASS CONCENTRATION ACROSS THE SHEET AND THERMOFORMING THE SHEET

This is a continuation-in-part of application Ser. No. 427,974 filed Dec. 26, 1973 now abandoned.

BACKGROUND OF THE INVENTION

The prior art discloses the extrusion of various

The prior art discloses the extrusion of various resins utilizing a variety of techniques. One area of resin extrusion, important in the industry of today, is concerned with the formation of polymeric sheet materials such as thermoplastic cellular material, which can be reshaped in thermoforming operations. A method common to the industry involves the use of polystyrene in the form of beads or pellets which is combined with a suitable nucleating agent and an expanding agent, and heated and cooled within fairly strict limits before entering the die of the extruding process. Prior art patents concerned with extruding thermoplastic cellular material which are related to the subject matter of this invention are U.S. Pat. Nos. 3,444,283 and 3,482,006.

SUMMARY OF THE INVENTION

The present invention relates to the manufacture of thermoplastic foam sheet material suitable for use in thermoforming operations. More particularly, the present invention is concerned with the method for forming polystyrene foam sheet varying in mass concentration bands of desired width across the sheet width. In yet another aspect, the present invention is concerned with the forming of thermoplastic foamed sheet material of selected and varying mass distribution which will match with the mass concentration requirements of a thermoforming process involving deep and shallow draw thermoforming. In yet a further aspect, the present invention is concerned with the use of apparatus for forming polystyrene foam sheet of varying mass concentration and the use of such mass distributed material to provide an improved product of a thermoforming operation.

Thermoplastic foam sheet material is formed by mixing an expandable bead material such as polystyrene beads with a nucleating agent and an expanding agent under carefully controlled temperature conditions and thereafter extruding the mixture through a die means particularly described below. In the prior art of U.S. Pat. No. 3,482,006 and 3,444,283 there is disclosed the formation of thermoplastic foam sheet under elevated pressure conditions which may be from 1000 to 5000 psig and specifically about 2000 psig starting with polystyrene resin pellets by mixing the pellets with a nucleating agent comprising citric acid and sodium bicarbonate. The mixture is then melted by heating in a mixing zone to a temperature within the range of 400°F. to about 450°F. A liquid blowing agent such as n-pentane or isopentane is then introduced into the polystyrene composition in a molten condition. The molten mass is passed through a mixing zone and a cooling zone which reduces the temperature of the mass to a temperature of about 250–315°F. before passing through an extruder die and expanded into a foam sheet product. In some operations the die is circular and the expanded foam sheet is ejected or discharged from the annular die as an expanding generally conical frustrum or expanding bubble in matching alignment with a larger diameter temperature monitored cylindrical mandrel over which the foamed cylindrical sheet passes. One or more knives attached to the cylindrical mandrel, split the cylindrical sheet into one or more separate sheets which pass through downstream elongated flat rollers thereby forming flat foam sheets of the expanded resin. It is recognized in this combination operation that there must be fairly close temperature control between the melt temperature and the die lip temperature in the range of 250°–300°F. since the extrusion temperature must be high enough to soften the resin so it can be expanded by the expanding agent but low enough so that the plastic is sufficiently viscous and coherent to form a relatively uniform and desired fine cell structure upon discharge from the die. Furthermore, controlling the temperature of the foamed sheet at the die and the cylindrical mandrel or other forming apparatus employed is also important to cell development, cell size, and mass concentration.

The present invention is particularly concerned with that portion of the above described process beginning with the extrusion die through which the resin is passed and subsequently expanded. More particularly, the present invention is concerned with die means for producing an expanded resin foam sheet discharged from the die which will have a desired width distribution of selected mass concentrations across the foam sheet recovered. In yet another aspect, the present invention is concerned with matching the produced variations in the foam sheet mass concentrations with that required in a downstream thermoforming process requiring different mass concentrations in different portions of a thermoforming mold.

In a particular aspect, the present invention is concerned with the preparation of polystyrene foam egg cartons by thermoforming in which operation the required mass concentration for the cavity or egg cell portion of the carton is greater than that required for the cover portion of the carton. The foam sheet material prepared by this invention and used in such a thermoforming operation is provided with desired width variations and foamed mass concentration therein which will coincide with that required in the deep and shallow draw portions of an egg carton thermoforming operation. Accordingly, it has been found that a die used in the extruding process can be formed or shaped to provide desired annulus thickness and width variations which will control the mass concentrations in any given portion of the foam sheet recovered from the die.

It is recognized that the egg cavity portion of an egg carton is a major contributor toward the functional strength of an egg carton. Therefore, to produce a minimum weight egg carton of adequate structural strength, it is desirable and necessary to increase the concentration of mass in the egg cavity portion of the formed sheet subjected to deep drawing during thermoforming and decrease the concentration of mass in the cover portion of the formed sheet subjected to shallow drawing during thermoforming.

In the investigation leading to the concepts of this invention, it has been found that the overall weight of the carton can be reduced by the redistributed mass sheet of this invention and also used to form an improved egg carton. Furthermore, not only is the strength of the egg cavity portion increased without sacrificing carton material costs, but overall carton material costs are reduced by reducing the overall weight of the carton and thus reducing the amount of material required to produce the carton. In addition, the redistributed mass polystyrene foam sheet material prepared as herein provided also permits obtaining a greater range of tolerances in the thermoforming process itself used to form good carton designs. This increases the overall productivity of the thermoforming equipment thereby contributing to improved and reduced manufacturing costs.

BRIEF DESCRIPTION OF THE DRAWINGS

FIG. I represents a diagrammatic relationship in die orifice configuration with extruded foam resin of varying or distributed mass concentration coordinated with a more desirable concentration of mass in the cover and egg cavity portion of an egg carton.

FIG. II graphically presents a relationship in egg carton cover and cell cavity weights obtainable with the mass distributed foam sheet compared with that obtained using a uniform mass foam sheet.

Figure 1:
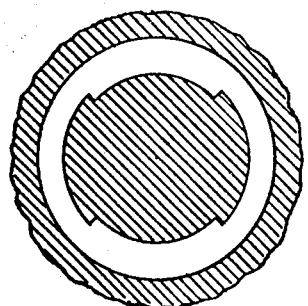

FIG. III graphically presents relationships of side and end crush strength of various weight egg cartons obtained with uniform mass and mass distributed polystyrene foam sheet material.

FIG. IV graphically presents a relationship in cell crush strength for different weight egg cartons obtained with uniform mass and mass distributed polystyrene foam sheet.

FIG. V diagrammatically depicts one end view arrangement of an extruder die annulus providing thin and wide channels of the same and different widths for producing the mass distributed foam sheet of the invention.

FIG. VI diagrammatically depicts one crosssectional view of an extruder die configuration which may be used to produce the redistributed mass polystyrene foam sheet of this invention.

FIG. VII is a cross sectional view of a foam sheet, having redistributed mass, prior to thermoforming the sheet.

FIG. VIII is a cross sectional view through a set of matched mold elements thermoforming a pair of foam egg cartons, in side by side relationship, from the foam sheet of FIG. VII.

DISCUSSION OF SPECIFIC EMBODIMENTS

The normal production of egg cartons made prior tto this invention used extruded polystyrene foam sheet of relatively uniform mass concentration or basic weight across the width of the sheet. Thus for an egg carton total weight of about 20 grams, about 9 grams would make up the cover portion of the carton and 11 grams in the egg cavity portion.

A comparison of the egg cavity weight and the cover weight made from a standard production uniform mass sheet and the redistributed mass sheet of this invention is provided in FIGS. I and II. From this comparative diagrammatic information it is observed that an egg carton produced from the redistributed mass foam sheets C, D and E is either lighter in total weight and/or more weight is provided in the egg cavity portion thereof than in the egg cartons prepared from standard materials A and B thereby improving the strength of this portion of the carton. The curves of FIG. II are more dramatic for showing the improved weight and weight distribution of the cover and cavity portions of egg cartons prepared from the redistributed mass material of this invention.

FIG. III graphically presents data which dramatically identifies the improvements obtained by use of the redistributed mass sheet over the previously used standard uniform mass sheet. The data plotted in FIG. III show that the different total weight egg cartons produced from the redistributed mass sheet resisted side and end crush deformation much greater than the egg cartons produced from the more conventional uniform mass sheet material. The data plotted to form FIG. IV identify the improvement in the egg cell crush strength obtained by using the redistributed mass polystyrene sheet material.

FIG. V shows an end view of a die arrangement machined on the inner lip to provide an annulus varying in width with the outer lip of the die. The FIG. V end view shown in cross-section in FIG. VI shows the center portion of the die providing the inner lip herein referred to as the die plug with machined indentations varying in width and positioned within the outer die lip to form an annulus with the outer lip comprising in this specific arrangement a two diameter profile or annulus openings of desired width. This annulus permits the mass of material passed through the die aperture or annulus to vary with each change in annulus width and thickness to form the variations in redistribution mass desired and described herein. The FIG. V end view of the annulus shows inner lip portions of different diameter providing flat channels on corresponding changes in the annulus width which distribute the resin into correspondingly uniform sections or widths of different desired mass concentration. Thus the gap or distance between the inner lip and the outer lip controls the concentration of foamed mass extruded from the die and substantially and desired width variation in mass concentration can be effectively controlled as a function of annulus width variations by machined sections formed in either the inner and/or outer lip surface of the die. In the specific arrangement of FIG. V, the inner lip or annulus surface of the die plug is machined to provide the wide shallow channels which are relied upon to meter or restrict the concentration of mass flowing through that portion of the die annulus to provide extruded foam resin sheet of desired mass distribution. Also, the outer lip of the annulus may be machined for matching alignment with machined depressions on the inner lip. The plug surface of FIG. V is machined in a specific embodiment to provide a minimum circle diameter of about 2,6840" diameter to form the shallow channel portions of the plug also provided with a maximum diameter of 2,6940". A die plug or inner lip machined to provide a 28 mil and a 33 mil annulus, as shown in FIG. I, extruded a sheet of foamed polystyrene resin having the characteristics identified in the thickness and basic weight profile. Of course other variations in channel thickness and width will produce corresponding changes in extruded foam thickness and mass concentration. These changes can be related to the mass of material required in subsequent thermoforming operations comprising deep and shallow draw operations. That is, the deeper the draw the more the mass is concentrated in that portion of the sheet to be so thermoformed.

In the cross-sectional arrangement of FIG. VI, a polymer melt having an optimum temperature of about 300°F. enters the die. A redistribution of the mass of polymer melt introduced to the die can be initiated at substantially any point in the die body machined as herein defined. In a specific embodiment, machining of the inner lip and thus changing the concentration in the resin mass was achieved in the last half inch portion of the die before discharge therefrom.

As shown in FIG. VII, which illustrates a typical cross section through a foam sheet, generally designated as 11, having redistributed mass, the central portion 13 is thicker than opposite adjacent portions 12 of the foam sheet 11. The thicker central portion 13 of the foam sheet will eventually be that portion of the foam which is to be drawn to the greater extent than the opposite adjacent portions 12, during the thermoforming operation.

FIG. VIII shows a typical matched mold thermoforming operation wherein opposite mold portions 14a and 14b are cycled together to form the preheated foam sheet stock into a pair of egg carton structures in side-by-side relationship. Insofar as egg carton molding operations are concerned, the thicker portion 13 of the foam is positioned so that it corresponds to that area of the egg carton which requires greater draw during the forming operation, namely the cellular portion thereof as contrasted to the carton top section.

Having thus provided a general discussion of the invention and described specific examples in support thereof, it is to be understood that no undue restrictions are to be imposed by reasons thereof except as defined by the following claims.

I claim:

1. In a method for the extrusion and subsequent thermoforming of polystyrene foam sheet material, the improvement which comprises, extruding polystyrene foam sheet material to produce an extrudate characterized by having varying mass concentrations in selected widths by the step of extruding polystyrene through an annular die orifice, said orifice having at least two adjacent sections around its periphery of varying gap size; subsequently subjecting the formed polystyrene sheet of varying thickness to thermoforming individual articles, said articles being characterized by having at least two sections, one of said sections being drawn to a greater extent than said other section, said article section being drawn to the relatively greater extent being formed from the thicker portion, having higher mass concentration, of said polystyrene foam sheet material.

2. The process of claim 1 wherein the higher mass concentration in the extruded sheet is within a restricted width and is used to form the egg cell portion of an egg carton and the lower mass concentration portion of the extruded sheet is used to form the cover and flap portion of the egg carton.

3. The process of claim 1 wherein the extruded polystyrene foam material comprises several side by side widths of different mass concentration and these are aligned in a thermoforming operation to provide the highest material mass concentration for forming a deep draw operation.

* * * * *